(12) United States Patent
Yuan

(10) Patent No.: US 9,712,461 B2
(45) Date of Patent: Jul. 18, 2017

(54) DATA CACHING SYSTEM AND METHOD FOR ETHERNET DEVICE

(71) Applicant: ZTE Corporation, Shenzhen, Guangdong (CN)

(72) Inventor: Feng Yuan, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 153 days.

(21) Appl. No.: 14/437,904

(22) PCT Filed: Oct. 21, 2013

(86) PCT No.: PCT/CN2013/085607
§ 371 (c)(1),
(2) Date: Apr. 23, 2015

(87) PCT Pub. No.: WO2014/063599
PCT Pub. Date: May 1, 2014

(65) Prior Publication Data
US 2015/0295859 A1 Oct. 15, 2015

(30) Foreign Application Priority Data
Oct. 26, 2012 (CN) .......................... 2012 1 0415255

(51) Int. Cl.
*H04L 12/28* (2006.01)
*H04L 12/931* (2013.01)
(Continued)

(52) U.S. Cl.
CPC ........ *H04L 49/351* (2013.01); *H04L 47/6245* (2013.01); *H04L 49/901* (2013.01); *H04L 61/6009* (2013.01)

(58) Field of Classification Search
CPC . H04L 47/6245; H04L 49/351; H04L 49/901; H04L 61/6009
See application file for complete search history.

(56) References Cited

U.S. PATENT DOCUMENTS 6,771,646 B1 * 8/2004 Sarkissian ............. G06F 12/123
370/252
2002/0178291 A1 11/2002 Senthil
(Continued)

FOREIGN PATENT DOCUMENTS

CN 1467956 A 1/2004
CN 1855880 A 11/2006
(Continued)

OTHER PUBLICATIONS

International Search Report in international application No. PCT/CN2013/085607, mailed on Jan. 23, 2014.
(Continued)

*Primary Examiner* — Kan Yuen
(74) *Attorney, Agent, or Firm* — Oppedahl Patent Law Firm LLC

(57) ABSTRACT

A data caching method for an Ethernet device is provided. The method includes: receiving data frames from various Ethernet interfaces and converting the Ethernet data frames received from the Ethernet interfaces into data frames having a uniform bit width and a uniform encapsulation format; maintaining a cache address in which data has already been written and a currently idle cache address in a cache; receiving the currently idle cache address and generating a write instruction and/or a read instruction for the cache and performing a write operation and/or a read operation so as to write the data received and processed by an IPC into the currently idle cache or to read data from the cache; and performing bit conversion and format encapsulation on the data that is read according to a read request and outputting the data subjected to the bit conversion and the format encapsulation through a corresponding Ethernet interface. A data caching system for an Ethernet device is also provided. By means of the data caching method and system provided herein, the expandability and the high bandwidth storage (Continued)

capacity of a network switching device can be improved, a high bandwidth utilization rate is achieved, and it becomes possible to improve bandwidth utilization rate based on traffic management.

14 Claims, 6 Drawing Sheets

(51) Int. Cl.
*H04L 12/879* (2013.01)
*H04L 12/863* (2013.01)
*H04L 29/12* (2006.01)

(56) References Cited

U.S. PATENT DOCUMENTS

2011/0225376 A1    9/2011   Hasting
2012/0300792 A1*   11/2012   Patel ................... H04L 69/324
                                                                                                     370/476

FOREIGN PATENT DOCUMENTS

| CN | 1859275 A | 11/2006 |
| CN | 101146091 A | 3/2008 |
| CN | 201118640 Y | 9/2008 |
| CN | 101567845 A | 10/2009 |
| CN | 102629914 A | 8/2012 |

OTHER PUBLICATIONS

English Translation of the Written Opinion of the International Search Authority in international application No. PCT/CN2013/085607, mailed on Jan. 23, 2014.
Supplementary European Search Report in European application No. 13849347.3, mailed on Sep. 29, 2015.

* cited by examiner

DATA CACHING SYSTEM AND METHOD FOR ETHERNET DEVICE

TECHNICAL FIELD

The present disclosure relates to the data caching field and more particularly to a data caching system and a data caching method for an Ethernet device.

BACKGROUND

Part of English abbreviations used herein and explanations thereof:
RAM: random access memory;
SRAM: Static RAM;
SDRAM: Synchronous Dynamic RAM;
MAC: Medium Access Control;
DDR: Double Data Rate;
QDR: Quad Data Rate;
FCS: frame check sequence;
CRS: Cyclical Redundancy Check;
FIFO: First input First Output queue;
FPGA: Field Programmable Gate Array;
ASIC: Application Specific Integrated Circuit;
QoS: Quality of Service;

With the popularization of broadband networks on a large scale, the requirement on the performance of a network communication device becomes higher and higher, and the development tendency of network communication devices is towards high performance and high bandwidth utilization rate. As a result, the high-speed network data exchange and traffic management property have become two major functions for network switching devices.

An Ethernet device is a main device in the network switching. To relieve the growing expansion of bandwidth application demands in a data center, a service provider and other traffic-intensive high performance computing environments, the rates for two kinds of new high speed Ethernets, that is, 40G Ethernet and 100G Ethernet, were normalized by the IEEE 802.3ba standard in June 2010, which paves the way for the development of a new wave of higher-speed Ethernet applications.

The Ethernet frame format of the IEEE 802.3ba standard is the same as the frame format of the IEEE802.3 standard. Similar to the XGMII interface of a 10G Ethernet, the media independent interfaces of a 40G Ethernet and a 100G Ethernet are an XLGMII interface and a CGMII interface, the XLGMII and the CGMII both employ eight channels for byte distribution to distribute a 8-bit data signal and a 1-bit control signal on each channel, thus, the bit widths of the interfaces are expanded to 64-bit (8-byte) data and 8-bit control signal. When a control signal is valid, control information is carried on a data line, and when a control signal is invalid, Ethernet valid data is carried on the data line. To perform a logical design at a relatively high clock frequency, the MAC interfaces of a 40G Ethernet and a 100G Ethernet are generally improved in data width and reduced in working frequency. Taking the MAC of a 100G Ethernet as an example, the data width of the MAC is 640 bits, the control bit width of the MAC is 80 bits, and in this case, the operating clock is 156.25 MHz.

To increase the bandwidth utilization rate of existing networks, more and more attention is being paid to the traffic management function of a network device. To provide bandwidth optimization for the fine management of different levels of services, a network device must have a sufficient cache space for supporting the switching capacity under a high bandwidth. In existing network switching devices, the common data memories mainly consist of two kinds of RAMs: SRAM and SDRAM.

Generally, SRAM has a small storage capacity, for example dozens of M bits, and the SRAM can be realized on a chip with low power consumption. SARM is advantaged in simple operation and 100% bandwidth utilization rate; a network switching device using an SRAM as a cache is usually deployed in a layer-2/layer-3 fast switching chip in an Ethernet, and such applications have a particularly high requirement on packet switching speed and a low requirement on storage capacity.

SDRAM generally has a large capacity, and mainly includes DDR and QDR, the currently most advanced DDR3 SDRAM chip is already capable of providing a storage capacity of 8G bits and stably running at a frequency of 2 GHz, thus, SDRAM can provide an extremely high storage capacity and a remarkably large theoretical bandwidth at a low cost. However, because of the structural properties of SDRAM, periodic refreshing is needed, for this and other reasons including tRP, tRFC and other overheads, the actual bandwidth utilization rate is very low. A network switching device using an SDRAM as a cache is generally deployed in chip device such as a layer-2/layer-3 traffic managing and network processing device in an Ethernet.

In a conventional network switching device, for a speed of 10G or below, a structure design for a device based on an SRAM or a DDR SDRAM is usually simple, and the performance of the designed device is satisfactory.

However, the application of a 40G or 100G fast switching device confronts the following problems:

1: The expandability of the conventional caching scheme is poor, which leads to the poor upgradability of a network device. For example, compatibility is unachievable when the bit width of an Ethernet interface is expanded from the 64 bits of an XGMII to the 640 bits of a CGMII;

2: The conventional caching device based on SRAM has a small capacity, and will not be supportive to traffic management and therefore can hardly increase the actual bandwidth utilization rate based on a service;

High-frequency SDRAM, although capable of providing enough actual bandwidth, is high in power consumption, moreover, the peripheral logic design of high-frequency SDRAM is highly difficult; and low-frequency SDRAM is low in actual bandwidth utilization rate because of a high proportion of overheads such as tRP and tRFC. For a device based on the conventional caching scheme, no improvements have been made according to the characteristics of SRDAM, which usually causes a performance bottleneck.

SUMMARY

To address the problem of the poor expandability of existing data cache, a data caching system and a data caching method are provided in the present disclosure.

On one hand, in accordance with an embodiment of the present disclosure, a data caching system for an Ethernet device is provided, which includes: an input package process device IPC configured to receive data frames from various Ethernet interfaces, and convert the data frames received from the Ethernet interfaces into data frames having a uniform bit width and a uniform encapsulation format; a package address management device PMG configured to maintain a cache address in which data has already been written and a currently idle cache address in a cache; a memory control device MCT configured to receive the currently idle cache address from the PMG, generate a write instruction and/or a read instruction for the cache, and perform a write operation and/or a read operation to write the data received and processed by the IPC into an currently idle cache or to read data from the cache, wherein the read instruction and/or the write instruction are/is based on an internal read request and/or an internal write request of the system or are/is generated according to a read request received from the outside of the system; and an output package process device OPC configured to perform bit conversion and format encapsulation on the data that is read by the MCT based on the read request, and output the data subjected to the bit conversion and the format encapsulation through a corresponding Ethernet interface.

Preferably, the IPC includes: a plurality of bit converters BCs, each of which is configured to receive the data frames from one type of Ethernet interfaces and independently convert the received Ethernet data frames into data frames having a uniform bit width and a uniform encapsulation format; and a port scheduler SCH is configured to perform a scheduling operation according to the data sending request of each BC, and send, by taking a data block of a size of fixed bytes as a unit, the data subjected to the bit conversion and the format encapsulation in the plurality of BCs to the cache in a scheduling sequence.

Preferably, each BC is connected with an FIFO; a read FIFO and a write FIFO are separately set to execute a read instruction or a write instruction so that a read channel is separated from a write channel; the read FIFO and the write FIFO are polled by a polling device; if there are a predetermined number of read instructions or write instructions in the polled FIFO, the polling device makes the polled FIFO execute the predetermined number of read instructions or write instructions at a time; if there is data needed to be processed in the polled FIFO while the number of the read instructions or write instructions accumulated within a preset period of time fails to reach a predetermined number, the polling device forces the polled FIFO to execute existing read instructions or write instructions at a time.

Preferably, the MCT includes: a Group Read/Write Order device GROUP configured to generate a write instruction according to a write request sent from the IPC and the currently idle cache address maintained by the PMG and execute the generated write instruction, generate a read instruction according to a read request sent from the OPC and execute the generated read instruction, and generate a read instruction according to a read request sent from an external application layer of the system and execute the generated read instruction; and an output channel mode selection device configured to select a data output channel, wherein the GROUP outputs the data read from the cache to the OPC or the external application layer of the system according to the output channel selected by the output channel mode selection device.

Preferably, the PMG maintains cache addresses according to a group data cache region and acquires an idle cache address through interleaving access, wherein after a first group of data cache regions are accessed, the other regions excluding the first group of data cache regions are accessed during a second access, and the first group of data cache regions are accessed again only when there is no idle cache address in the other regions excluding the first group of data cache regions; likewise, the other regions excluding the second group of data cache regions are accessed during a third access, and the second group of data cache regions are accessed again only when there is no idle cache address in the other regions excluding the second group of data cache regions; and if no idle cache address is found after each group of data cache regions are traversed, the current write operation is given up to discard data and not resumed unless there is an idle cache address available.

Preferably, the group data cache region groups are corresponding to a group of Bank addresses of the cache, wherein a first Bank is precharged after the first Bank is accessed and before the first Bank is accessed again.

Preferably, when a plurality of read instructions are generated by the MCT, the plurality of read instructions are sorted so that read instructions corresponding to cache addresses read in an interleaving manner are placed at the front to execute a read operation, and data is re-sorted in a sequence desired by the inside or the outside of the system and then output.

On the other hand, in accordance with an embodiment of the present disclosure, a data caching method for an Ethernet device is provided, which includes: S101: receiving data frames from various Ethernet interfaces and converting the Ethernet data frames received from the Ethernet interfaces into data frames having a uniform bit width and a uniform encapsulation format; S102: maintaining a cache address in which data has already been written and a currently idle cache address in a cache; S103: receiving the currently idle cache address and generating a write instruction and/or a read instruction for the cache, and performing a write operation and/or a read operation so as to write the data received and processed by an IPC into a currently idle cache or to read data from the cache, wherein the read instruction and/or the write instruction are/is based on an internal read request and/or an internal write request of the system or are/is generated according to a read request received from the outside of the system; and S104: performing bit conversion and format encapsulation on the data that is read according to the read request and outputting the data subjected to the bit conversion and the format encapsulation through a corresponding Ethernet interface.

Preferably, in step S101, the data subjected to the bit conversion and the format encapsulation is scheduled to be sequentially sent to the cache in a scheduling sequence by taking a data block of a size of fixed bytes as a unit.

Preferably, the algorithm for the scheduling is based on a ROUND-ROBIN polling algorithm or a weighted ROUND-ROBIN polling algorithm.

Preferably, in Step S103, the generated read instructions or write instructions are accumulated, and when the generated read instructions or write instructions are accumulated to a predetermined number, the accumulated read instructions or write instructions are executed at a time; if the number of the read instructions or write instruction accumulated within a given period of time fails to reach the predetermined number, the accumulated read instructions or write instructions are executed at a time.

Preferably, in S102, the maintenance refers to the maintenance of cache addresses according to a group data cache region, and the idle cache address is acquired through interleaving access, wherein after a first group of data cache regions are accessed, the other regions excluding the first group of data cache regions are accessed during a second access, and the first group of data cache regions are accessed again only when there is no idle cache address in the other regions excluding the first group of data cache regions; likewise, the other regions excluding the second group of data cache regions are accessed during a third access, and the second group of data cache regions are accessed again only when there is no idle cache address in the other regions excluding the second group of data cache regions; and if no idle cache address is found after each group of data cache regions are traversed, the current write operation is given up to discard data and not resumed unless there is an idle cache address available.

Preferably, the group data cache region corresponds to a group of Bank addresses of the cache, wherein a first Bank is precharged after the first Bank is accessed and before the first Bank is accessed again.

Preferably, wherein when a plurality of read instructions are generated, the plurality of read instructions are sorted so that read instructions corresponding to cache addresses read in an interleaving manner are placed at the front to execute a read operation, and data is re-sorted in a sequence desired by the inside or the outside of the system and then output.

The present disclosure has the following beneficial effects:

the method and the system provided herein are supportive to a plurality of Ethernet interfaces such as XGMII, XLGMII and CGMII as well as a Bypass mode and an Applicant Mode and can be flexibly applied to a fast switching network and a traffic management network to overcome the low efficiency of SDRAM. The system and the method provided herein with high expandability improve the expandability and the high bandwidth storage capacity of a network switching device, realize a high bandwidth utilization rate and make it possible to improve bandwidth utilization rate based on traffic management. The present disclosure directly realizes the Bank interleaving of an SDRAM in a write direction through cache address management and optimizes the input Bank addresses by re-sorting the Bank addresses in a read direction, thus minimizing the utilization rate consumption of a cache bus operation caused by an overhead time.

DETAILED DESCRIPTION

The present disclosure is described below in detail with reference to embodiments when read in conjunction with accompanying drawings. It should be appreciated that the specific embodiments described herein are merely illustrative of the present disclosure but not to be construed as limiting the present disclosure.

Figure 1:
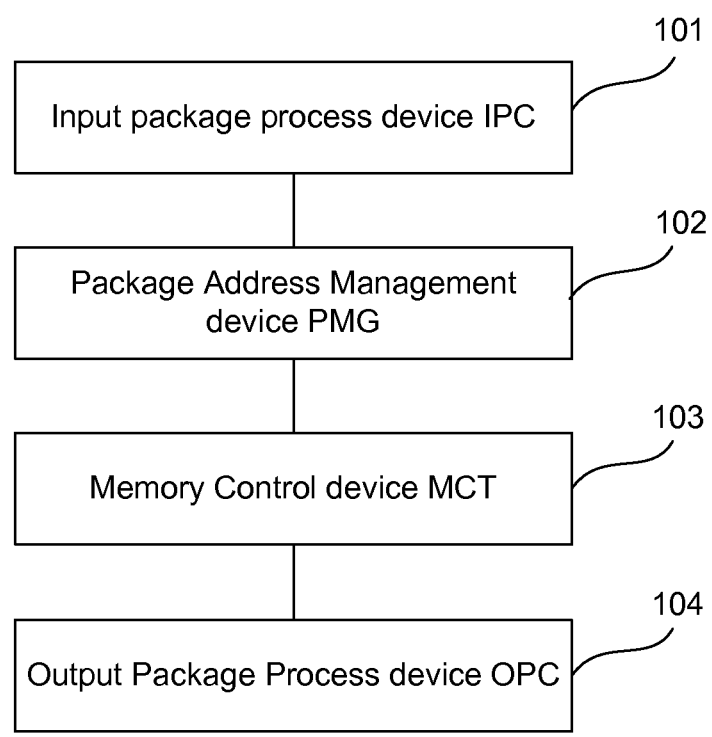
FIG. 1 is a schematic diagram illustrating the structure of a data caching device for a network switching device according to an embodiment of the present disclosure.

FIG. 1 is a block diagram illustrating the structure of a universal data caching system according to an embodiment of the present disclosure, specifically, the universal data caching system includes:

an input package process device (IPC) 101 configured to receive Ethernet data frames from a plurality of external high-speed interfaces and perform bit conversion and frame format conversion, the IPC including:

bit converters (BCs): the plurality of independent BCs receive data messages input from different Ethernet interfaces such as XGMII, XLGMII and CGMII, detect the control word 'Start Of Package' (SOP) of a package, the control word 'End Of Package' of the package, perform bit conversion on messages of different bit widths, re-encapsulate the control words 'SOP' and 'EOP' of the package and perform a frame error check on the data messages; and a port scheduler (SCH) configured to receive a port data scheduling request from each BC port and select a BC port for sending data in a ROUND-ROBIN or Weighted ROUND-ROBIN manner during each polling process;

a Package Address Management device (PMG) 102 configured to uniformly manage cache addresses and maintain an address in which data has already been written and a currently idle address into which data can be written in an SDRAM/SRAM cache;

In the PMG, SRAM/SDRAM cache addresses are separately and independently managed according to the Banks of the SDRAM, so that Banks are switched after each Burst operation, thus guaranteeing the interleaving access to the Banks and maximizing the interval at which the same Bank is accessed for two successive times.

a Memory Control device (MCT) 103 configured to receive cache address from the PMG, receive a data read request and/or a data write request from the system and an external application, generate a read/write command for the SRAM/SDRAM cache and execute the generated command, the MCT 103 including:

a Group Read/Write Order (GROUP) device configured to exchange data with the SRAM/SDRAM cache through a unified interface, receive data currently needed to be written into the cache and a corresponding cache address, as well as the data needed to be read from the inside or the outside of the system and a corresponding cache addresses, generate a read instruction or a write instruction for the cache according to the data and the corresponding cache addresses and read or write the data, for example, write the Ethernet date from the IPC into a corresponding idle cache address or read Ethernet data from a designated cache address, Preferably, the GROUP device may further adjust the generated read instruction or write instruction, and after a predetermined number of read instructions or write instructions are accumulated, send the accumulated read instructions or write instructions at a time so as to perform a continuous read or write operation on the SRAM/SDRAM cache, thus, the read/write command operation efficiency of the cache is high; and an output channel selection Mode device configured to select a package output channel and support a Bypass mode output and an Applicant mode output, wherein the Bypass mode in which a package is directly output is mainly for the switching of Ethernet packages but also for loop detection; and in the Applicant mode, a package is externally output to an external application layer, and the external application layer sequentially outputs the cached packages according to the application mode of a required scenario, the Applicant mode is applicable to a QoS-level scenario; and an output package process device (OPC) 104 configured to receive output data from the GROUP device, perform data frame bit conversion and frame format conversion using an internal BC inverter and send the data subjected to the data frame bit conversion and the frame format conversion to high-speed interfaces such as XGMII, XLGMII and CGMII, wherein the BC inverter carries out an inverse operation with respect to the foregoing BC device.

Figure 2:
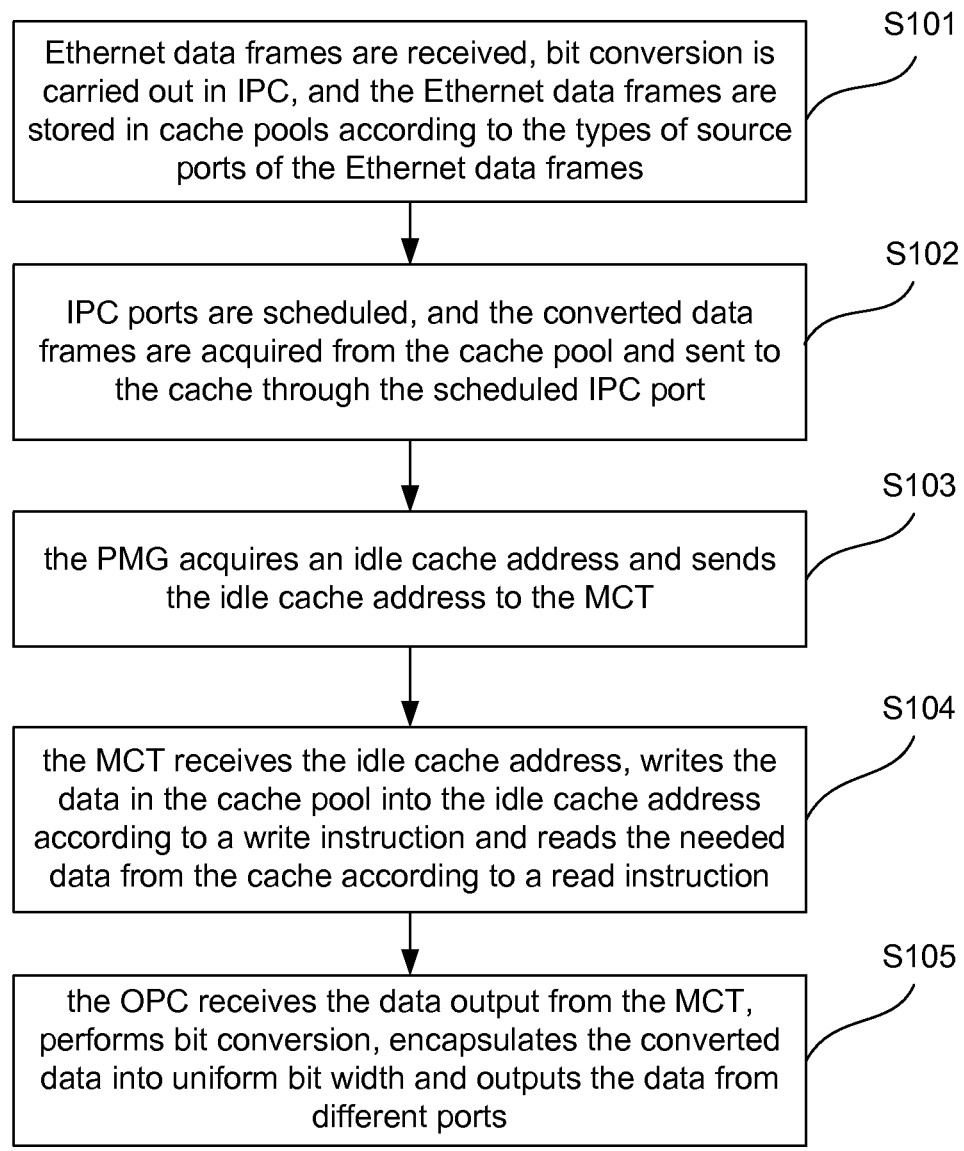
FIG. 2 is a flowchart illustrating the structure of a data caching method for a network switching device according to an embodiment of the present disclosure.

Based on the foregoing universal data caching system, a universal data caching method is also provided in an embodiment of the present disclosure which, as shown in FIG. 2, specifically includes the following steps:

Step S101: data is received from various Ethernet interfaces such as XGMII, XLGMII and CGMII ports, bit conversion and frame format conversion are separately carried out in independent BCs for the data of each kind of ports to uniformly convert the bit widths of the different interfaces to the internal bit width of a system, and format encapsulation is implemented;

in this step, the BC also checks the validity of a data frame format, performs an FCS or a CRC check on the content of the package, shields a data frame in an error format and discards an error data frame checked.

Step S102: BC ports currently needing to send data are scheduled using an SCH to select a BC port for sending data, the data subjected to the bit conversion and the format conversion is acquired from the BC port and sent to an FIFO to be read so as to write needed data into an SRAM/SDRAM cache.

The algorithm for the scheduling may be based on ROUND-ROBIN or weighted ROUND-ROBIN, and the ROUND-ROBIN and the weighted ROUND-ROBIN may be switched through a configuration.

Step S103: the PMG acquires a cache address into which data can be currently written and then sends the cache address to a GROUP device, in this step, a data frame for which no cache address is provided for writing is discarded.

Step S104: the GROUP device acquires the cache address sent from the PMG, receives cache data needing reading and a corresponding cache address from the inside or the outside of the whole system and generates a write command or a read command.

Preferably, the GROUP device adjusts the read/write command and, after a predetermined number of read/write commands are accumulated, sends the read/write commands at a time for continuous reading or writing; if the number of the accumulated commands cannot reach the predetermined number, then a counter counting within a given period of time is set so that the accumulated commands are sent at a time for continuous reading or writing when the value counted by the counter is reached, wherein the number of the continuously read/written commands and a timer are both configurable.

Step S105: Ethernet data output from the GROUP device is received, subjected to bit conversion in each independent BC inverter, encapsulated and then output from Ethernet interfaces corresponding to bit widths;

The universal data caching system and method provided herein supportive to various Ethernet interfaces such as XGMII, XLGMII and CGMII are highly expandable and capable of reading or writing data continuously, besides, the system and method achieve a high cache read/write command operation efficiency and can be directly applied to an FPGA or ASIC as needed to improve the expandability and the high bandwidth storage capacity of a network switching device.

The data caching method provided herein is described below by taking data of a 10G Ethernet as an example. The clock frequency is 156.25 MHz, the data width of the XGMII interface is 64 bits and the control data width of the XGMII interface is 8 bits, at the same clock frequency, the data width, the control data width and the clock frequency of the Ethernet data of a 40G XLGMII interface are all four times higher than those of data of a 10G Ethernet; the data width of a 100G CGMII interface is 640 bits, and the control data width of the 100G CGMII interface is 80 bits.

Figure 3:
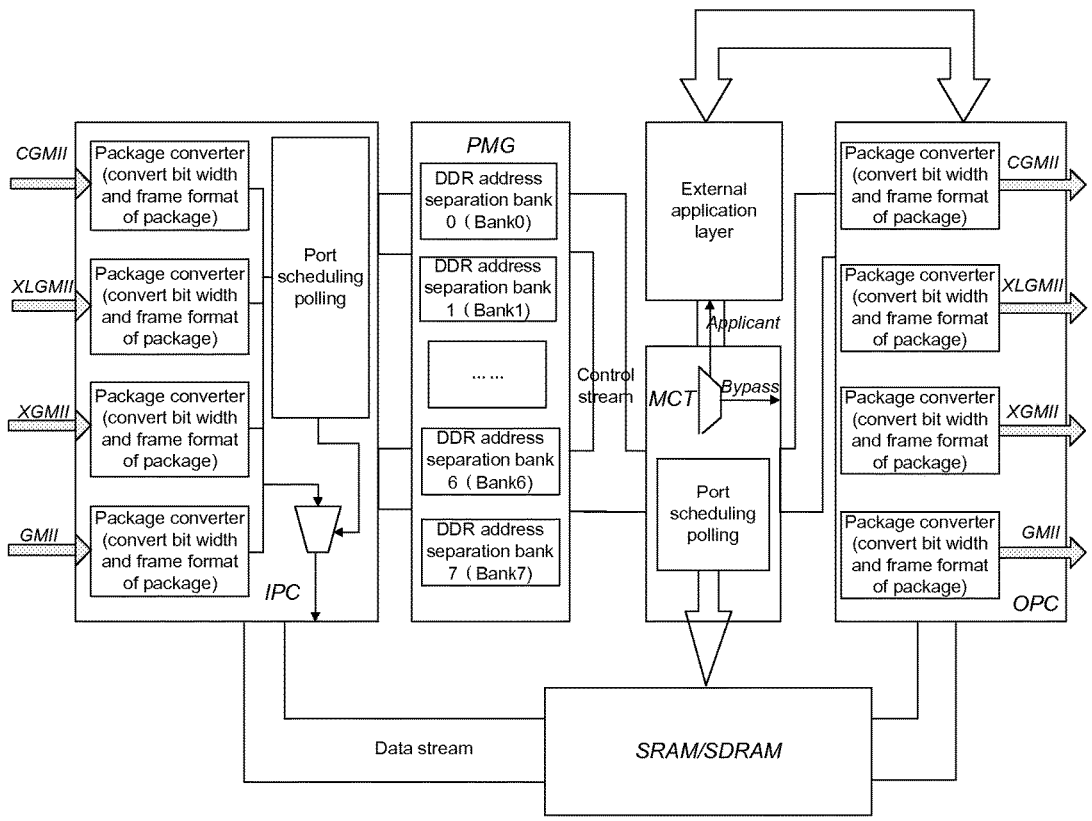
FIG. 3 is a diagram illustrating the overall framework of an embodiment of the present disclosure.

FIG. 3 is a diagram illustrating the overall framework of the embodiment, and the data caching method specifically includes the following steps:

Step 1: an IPC receives a package, the data and related control information sent from a port are subjected to bit conversion and frame format conversion first, a BC supporting an Ethernet MAC data frame format conversion from 32 bits to 640 bits is configured for each high-speed interface.

The bit widths of different interfaces are uniformly converted to the internal bit width of a device and a format encapsulation operation is implemented. The format is encapsulated according to that a frame head is SOP and a frame end is EOP. The number of the BCs supportable ranges from 1 to 32, and the input bit width supported by each interface changes from 32 bits to 640 bits, and the supported internal bit supported also changes from 32 bits to 640 bits.

Figure 4:
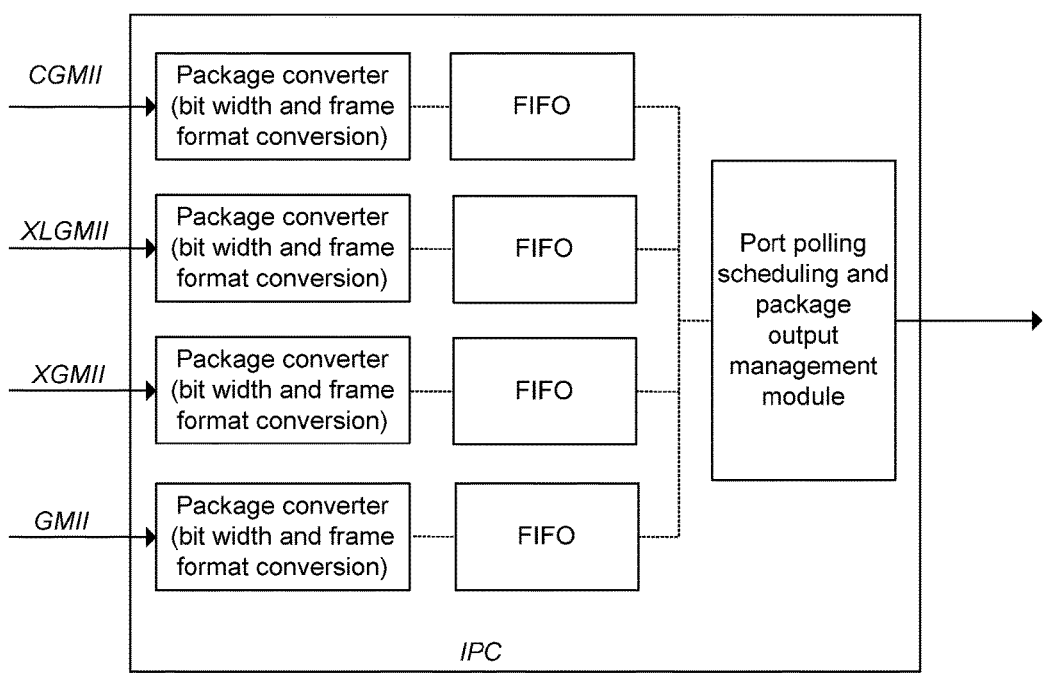
FIG. 4 is a schematic diagram illustrating the connection relationship between a plurality of BCs and a plurality of FIFOs.

Step 2: the converted port data and the related control information are stored in an FIFO, the FIFO of each port is independent, and as shown in FIG. 4, each converter is connected with an FIFO, and the converted Ethernet data is written into an FIFO.

Figure 5:
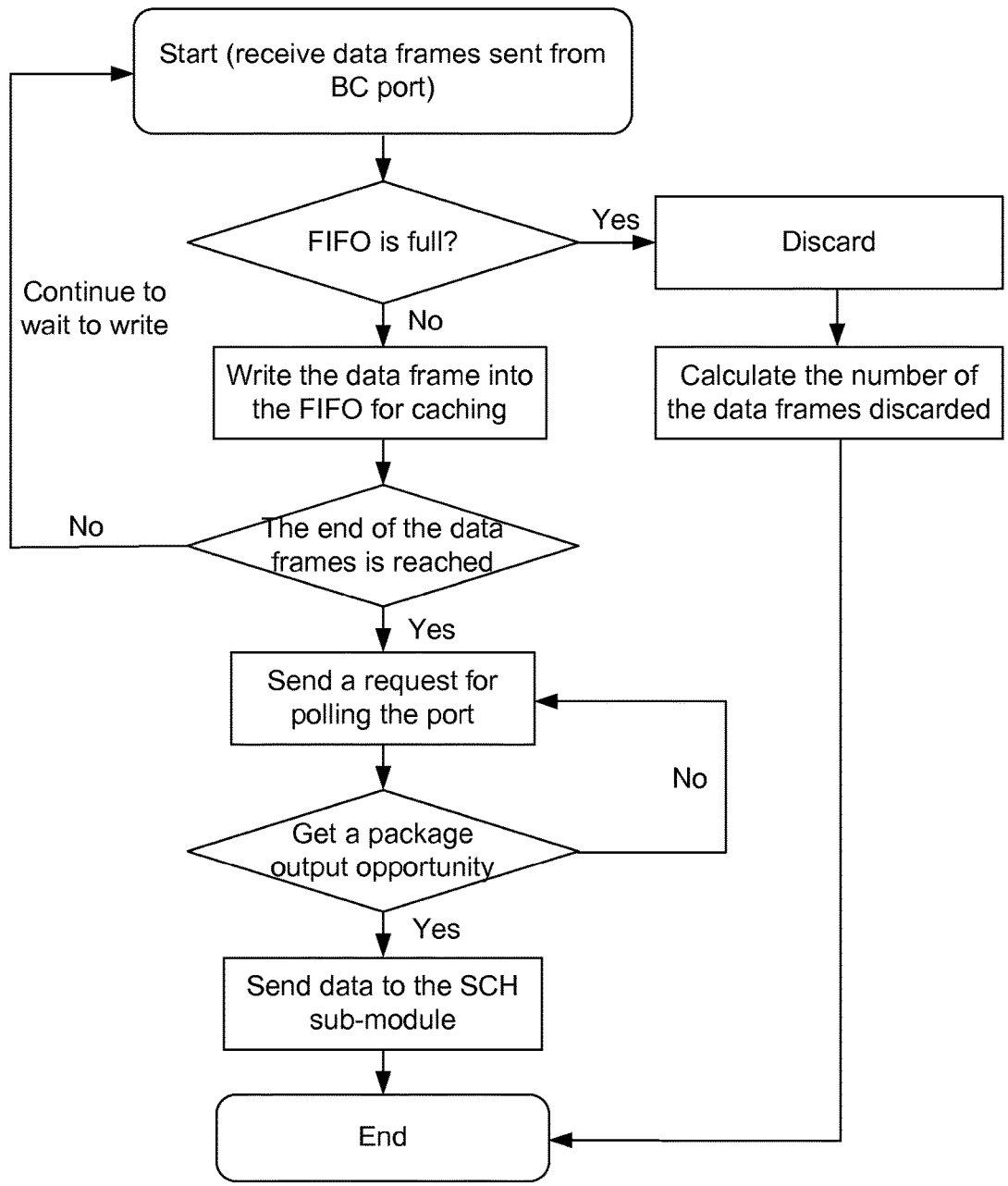
FIG. 5 is a flowchart illustrating the writing of data from a BC to an FIFO according to an embodiment of the present disclosure.

As shown in FIG. 5 which illustrates the flow of the writing of BC port data into an FIFO, the writing of BC port data into an FIFO is started when the frame head SOP of a package is detected if there is enough space in the FIFO, the package sent from a port will not be written into a data FIFO any more after the FIFO is fully written; if the last package is not completely stored in a data FIFO yet when the FIFO is full, then the package is processed as an error; if the last package is stored at the end of a data frame when an FIFO is full, then an application for polling the FIFO port is sent, after a package output opportunity is gotten through the scheduling of an SCH, the data is sent to the SCH and sequentially sent to the PMG. Once a data FIFO enters a FULL state, the FULL state cannot be released unless the residual space of the package FIFO is larger than a predetermined number of bits (e.g. 64 bits). The bit width of the FIFO is that output by the BC, and the set depth of the FIFO should guarantee the caching of the maximum traffic impact from the interface within the processing delay of a data message on the condition that a data channel suffers no backpressure.

Step 3: the SCH schedules ports having data waiting to be sent according to the states of data FIFOs and selects a port for sending data. Before data is sent, it is checked whether or not the PMG has an idle address for writing data, if so, data is sent from an SDRAM/SRAM to the SCH through the selected port by taking a data block of a size of given bits as a unit, and the SCH transmits the data to the PMG. In a case where the end of a package consists of data smaller in size than a data block, then the package is transmitted in its actual size. After receiving a backpressure signal which is given by the PMG as the PMG cannot timely provide an idle address, the SCH stops responding to data sending requests of the port FIFOs after completing the current data block transmission until the backpressure signal of the PMG is cleared.

The SCH schedules the port Ethernet data waiting to be sent using a ROUND-ROBIN or Weighted ROUND-ROBIN polling method. In the ROUND-ROBIN polling mode, the port currently having data is served first; if there are a plurality of ports having data for sending, then the plurality of ports are served in a ROUND-ROBIN manner by taking a data block as a unit. In the weighted ROUND-ROBIN polling mode, a configurable weight value is set for each port, a weight is consumed in each ROUND-ROBIN which is performed by taking a data block as a unit, the ROUND-ROBIN polling method is mainly applied in a scenario where the internal bandwidth of a system is smaller than the sum of the bandwidths of all input ports, and some ports can be selectively abandoned at an input port in the weighted ROUND-ROBIN polling mode.

Step 4: the PMG manages the distribution and the recovery of data cache regions and maintains an address in which data is already written and a currently idle address into which data can be written in the current cache.

Figure 6:
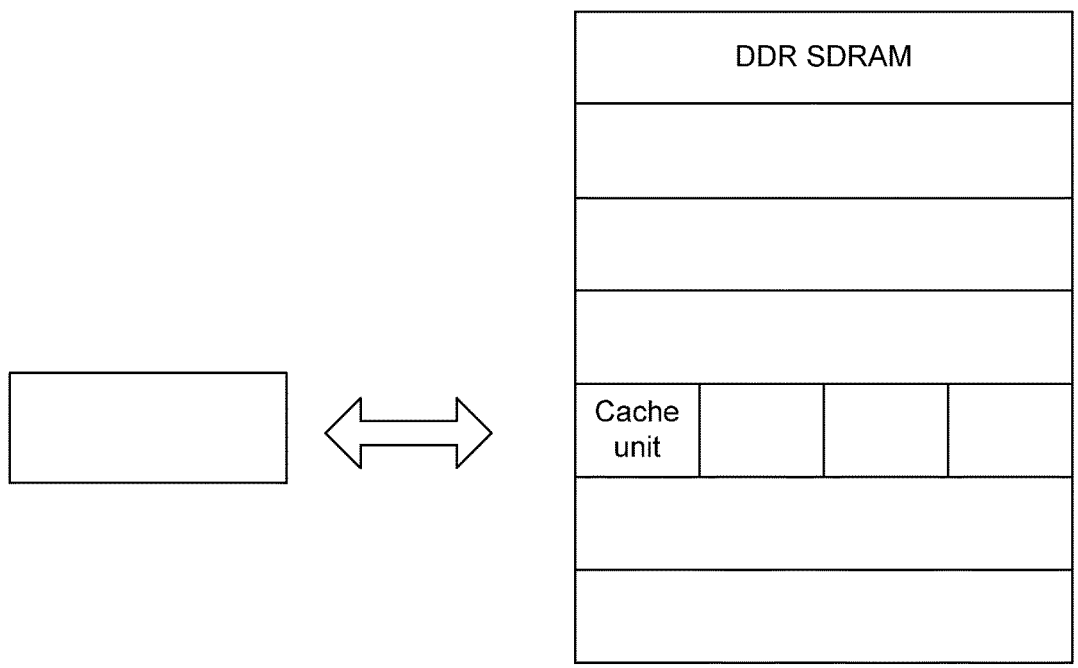
FIG. 6 is a schematic diagram illustrating the management of a DDR SDRAM cache unit by a PMG according to an embodiment of the present disclosure.

The PMG manages the data cache regions according to cache units which are fixedly distributed according to the biggest package supported by the system. As shown in FIG. 6, the maximum Ethernet data package size is 2048 bytes, thus, the maximum package size of the cache units is set to be 2048 bytes, the total size of all the cache units is corresponding to the total size of SDRAM/SRAM caches. In the initial state of the system, all the data cache regions internally managed by the PMG are distributable state.

The cache distribution process of the PMG is as follows: after receiving a data write request from the IPC, the PMG checks whether or not the currently idle cache region can provide enough space for new data to write in, if so, distributes an idle cache region for data writing and internally marks the status bit of the cache unit as 'used'.

There are two kinds of cache recovery processes of the PMG, in the Bypass mode, the PMG directly transmits the storage address corresponding to the package, the size of the package, Ethernet type and other related information, to the OPC through the MCT, after processing the related information, the OPC reads data from a corresponding cache address of the MCT, after the data is read, the PGM recovers a corresponding cache address and internally marks the cache unit as 'idle' for the next distribution; in the Applicant mode, the PMG directly transmits the storage address corresponding to the package, the size of the package, Ethernet type and other related information to an external application through the MCT, the external application performs a QoS processing on the related information of the package and then returns OPC description information, and similarly, after the OPC reads data from the MCT, the PMG recovers a corresponding cache address and internally marks the cache unit as 'idle' for the next distribution, then the read operation and the recovery of a cache address are completed.

To improve the efficiency of an SDRAM, the data cache regions managed by the PMG are classified based on the features of SDRAMs. It is well known that the low efficiency of DDR SDRAM is due to the overheads caused by the dynamic refresh mechanism of DDR SDRAM, wherein the main overheads are as follows:

1: the row and the Bank addressed by the current read operation happen to be idle, that is, all the rows in the Bank are closed, in this case, a row valid command can be directly sent, the total time consumed before data is read is tRCD+CL, this situation is called Page Hit (PH);

2: the row addressed by the current read operation happens to be the working row of the former operation, that is, the row addressed by the current read operation is already in a strobe valid status, in this case, a column addressing command can be sent directly, and the total time consumed before data is read is CL, this situation is called Page Fast Hit (PFH);

3: one of the rows addressed by the current read operation is already active (not closed), in this case, an addressing conflict occurs, the working row must be closed through a precharge operation, then a row valid command is sent to a new row. The total time consumed is tRP+tRCD+tCL. This situation is called Page Miss (PM).

Read-write conversion overhead: a DDR SDRAM also requires a time interval for the switching from a read operation to a write operation and a time interval for the switching from a write operation to a read operation, the two time intervals are tRWT (Read to Write) which is generally 5-6 clock periods and tWTR (Write to Read) which is generally 4 clock periods; because of the characteristics of the write data of the DDR SDRAM, a read command cannot be sent unless a delay elapses from the completion of the writing of all write data into a data line, thus, a read-write conversion operation significantly lowers the efficiency of the DDR SDRAM.

It can be seen that the DDR SDRAM needs to close the row already opened in the current Bank, that is, perform a Precharge operation, every time the DDR SDRAM changes a row in the same Bank, then the DDR SDRAM activates the row needing accessing, that is, performs an Active operation, and finally carries out a data read/write operation. Moreover, a given delay, that is, tRP, is required between the Precharge operation and the Active operation in each Bank. The tRP of an ordinary SDRAM occupies four clock periods during which no data read/write operation can be performed. Thus, the bandwidth utilization rates corresponding to burst lengths 2, 4 and 8 are merely 28%, 44% and 61.5%. Further, in the DDR SDRAM, in the same Bank, two successive Active operations are required to be performed at a given time interval, that is, at tRC which typically approximates to 15-20 clock periods, thus causing a huge waste of bandwidth utilization rate.

For the foregoing overheads of a DDR SDRAM, the following methods are adopted in the present disclosure to minimize overhead time:

1): Bank interleaving technology: Banks are switched after each Burst operation is completed, and the overhead time tRP needed for closing the formerly accessed Bank is hidden in a Bank interleaving manner so as to guarantee the high utilization of a data bus as far as possible;

2): continuous read/write command technology: a predetermined number of read commands (write commands) are accumulated in each Burst operation, and a batch of read commands (write commands) are processed at a time so as to lowest the time overhead brought by read-write conversion;

3) read command re-sorting technology: the read commands received every time are re-sorted for the purpose of the interleaving of Bank addresses, and the Bank address that can be read in an interleaving manner is executed preferably. When being read finally, the data is re-sorted in an order desired by the OPC or an external application layer of the system and then output.

The foregoing Bank interleaving 1) is completed by the PMG, the forgoing technologies 2) and 3) are completed by the MCT, and the Bank interleaving 1) is completed in the following way:

(1) data cache regions are managed according to the Bank addresses of the DDR SDRAM, the eight Banks of a DDR3 are separately mapped to eight groups of data cache regions, each group of data cache regions are corresponding to a group of Banks of the DDR3, and the data cache regions are independent from each other;

(2) when retrieving an idle data cache for distribution from the data cache regions, the PMG preferably retrieves the idle data cache from the rest seven groups of data cache regions which are not distributed the last time or retrieves the idle data cache from the data cache addressed the last time and distributes the retrieved idle address only when no distributable idle address is retrieved from the rest seven groups of data cache regions.

Figure 7:
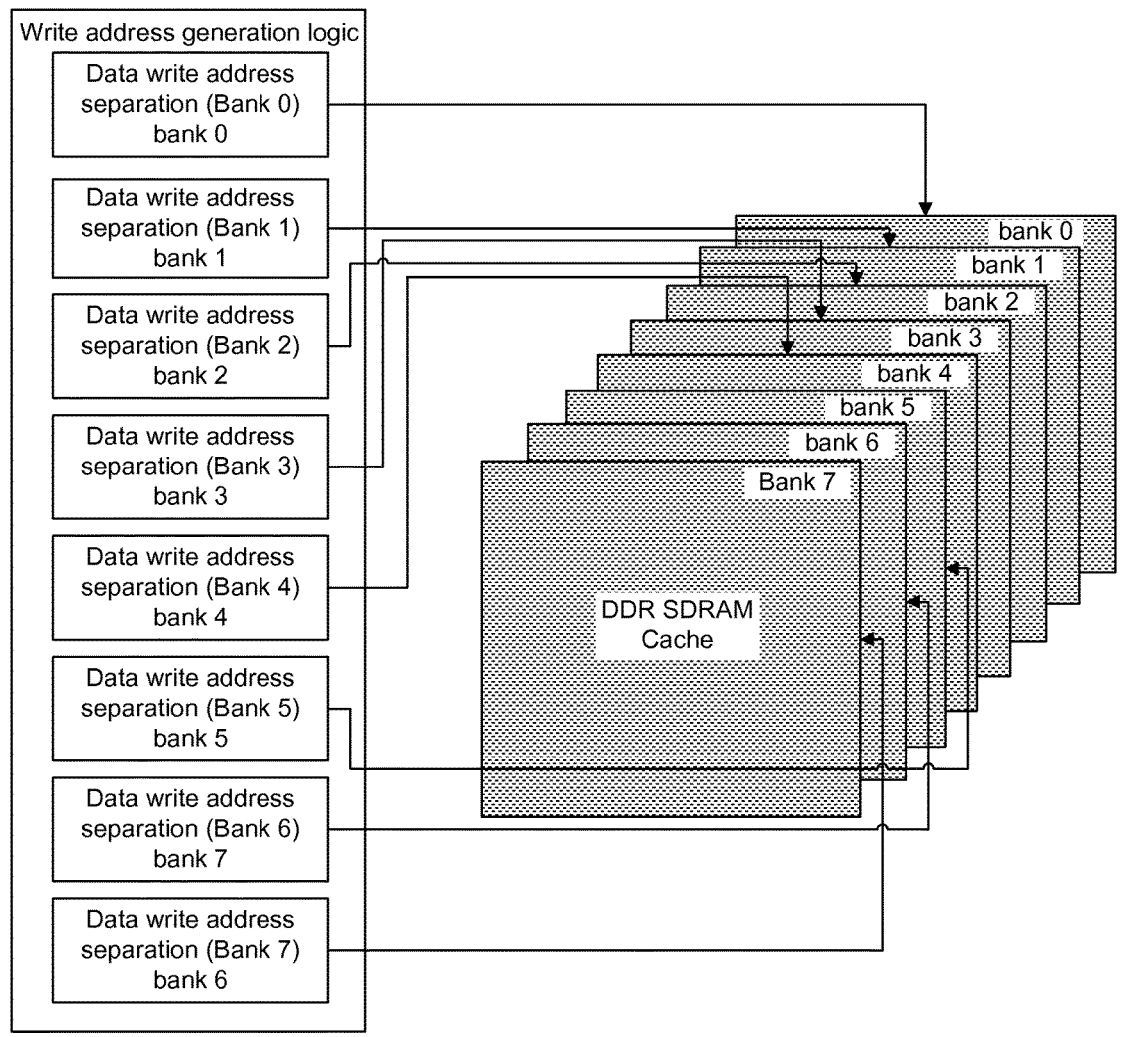
FIG. 7 is a schematic diagram illustrating the management on data cache regions according to 8 Banks of a DDR SDRAM according to an embodiment of the present disclosure.

For Bank0, during two successive Read operations aiming at different Rows, according to a normal address distribution flow, it is needed to perform a Precharge operation to close the Row opened in the first Read operation before the second Read operation is performed and sequentially perform an Active operation to open the Row to be accessed by the second Read operation. As to the addresses preferably distributed in the embodiment, as shown in FIG. 7, after the first Read operation is performed, the rest Banks are accessed in each of the second to the seventh operation. Specifically, Bank0 is accessed in the first Read operation, then the rest Bank1 to Bank 7 are accessed in the second data access, and Bank0 is only accessed again when no idle cache address is available in Bank1 to Bank7; for the sake of convenience in description, assuming that an idle cache address which is available for the current write operation is found in Bank1 during the second access, the third access can only access Bank0 and Bank 2 to Bank7, excluding Bank 1, and Bank 1 is only accessed again when there is no idle cache address in all Bank0 and Bank2 to Bank7; if no idle cache address is found after Bank0 to Bank7 are traversed, then the current write operation is abandoned and data is discarded; the write operation cannot be resumed unless there is an idle cache address available, in this way, the interleaving access of Banks is realized.

Further, the overhead time of Bank0 can be perfectly hidden as long as the Precharge operation which is performed on the Bank operated in the first read process between two successive ones of the second to the seventh operation enables the rest Banks to be accessed within the overhead time tRC between two successive Active operations aiming at Bank0, thus saving a lot of idle waiting periods.

Step 5: the MTC generates a read/write command and a read/write address regarding the cache and executes the read/write command. The MCT receives a cache address from the PMG, a data write request from the IPC, a read request of the OPC in a Bypass mode and a read request input by an external application in an Applicant mode and completes the interaction of the read/write data, the read/write command and the read/write address with the SDRAM/SRAM cache.

Here, the flow of the operation completed by the MCT in a write direction is as follows:

Step S201: it can be known from the description above that the PMG will cause no backpressure to the IPC and a write request will be received by the MCT from the IPC as long as there is an address space for data writing in the cache.

Step S202: the MCT acquires a cache address unit distributed by the PMG for the current package to write in, as a complete package can be stored in the cache address unit, the MCT acquires an initial address where the package can be written and starts calculating an offset address on the basis of the cache address unit corresponding to the data of each clock and synchronously gives a write command, in this way, the write command can be sent to an SDRAM/SRAM cache module corresponding to and together with a write address.

Step S203: the SDRAM/SRAM cache makes the received information correspond to write data, then the package can be written into a correct cache address.

Step 204: after the data is written into the cache, the MCT outputs the package size of the written data, the cache address where the written data is stored and other information according to the current work mode. The output information is directly transmitted to the OPC in the Bypass mode and to the outside in the Applicant mode.

The flow of the operation completed by the MCT in a read direction is as follows:

in the Bypass mode:

Step S301: in the Bypass mode, the MCT receives, from the OPC, the cache position of the package currently needing reading and synchronously acquires the size of the package.

Step S302: the MCT generates a read command according to the data cache address and the package size acquired and calculates the offset address of each read operation. Data of a given size is read from a cache according to an interface of the SDRAM/SRAM and recorded every time until complete data corresponding to the size of the package is read.

Step S303: the MCT returns the read data to the OPC every time the MCT finishes a read operation, but not returns the read data to the OPC only after the package is totally read, so as to relieve the workload of an additional cache in the system.

In the Applicant mode:

Step S401: in the Applicant mode, the MCT receives, from an external device, the cache position of the package currently needing reading and synchronously acquires the size of the package.

Step S402: the MCT generates a read command according to the data cache address and the package size acquired and calculates the offset address of each read operation. Data of a given size is read from a cache according to an interface of the SDRAM/SRAM and recorded every time until complete data corresponding to the size of the package is read.

Step S403: the MCT returns the read data to the OPC every time the MCT finishes a read operation, but not returns the read data to the OPC only after the package is totally read, so as to relieve the workload of an additional cache in the system.

Step 6: in the use of an SRAM cache, after the MCT completes the sending of the command, the address and the data, the SRAM cache module receives the data, then the write operation is directly completed.

Figure 8:
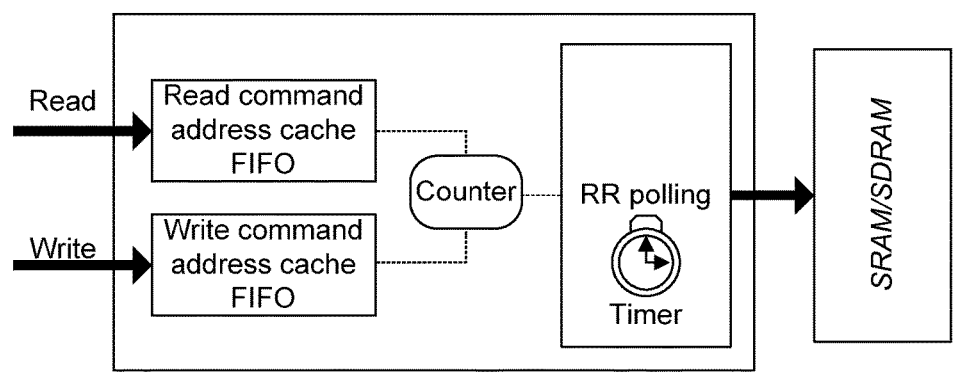
FIG. 8 is a schematic diagram illustrating a continuous read or write operation in the use of a DDR SDRAM cache according to an embodiment of the present disclosure.

Here, in the use of a DDR SDRAM cache, the following processing is carried out to improve the efficiency of the DDR SDRAM cache:

Step S501: a write channel is separated from a write channel, a command and a write address are set in the write direction of a write FIFO cache, and a command and a write address are set in the read direction of a read FIFO cache, as shown in FIG. 8.

Step S502: a polling device is set to acquire the commands and the addresses from the read FIFO and the write FIFO by turns. If there are a predetermined number of (e.g. 32) write commands or read commands stored in the read FIFO or the write FIFO, the polling device carries out a polling operation, otherwise, the polling devices waits.

Step S503: the polling device executes, at a time, all the commands (e.g. 32) of the current operation in the polled FIFO and then polls another FIFO.

Step S504: a timer and a configurable time value Tmax are set, if there is data needing processing in the read or write FIFO within the Tmax, then the data is processed, if the number of the accumulated commands cannot reach a given one, then the polling device forcedly polls the FIFO arriving.

By means of the foregoing device, a continuous read or write operation can be guaranteed when a DDR SDRAM cache is operated, thus avoiding the reduction of the efficiency of the DDR SDRAM caused by repeated read-write conversion.

Step 7: the OPC receives the data read from the cache, performs data bit conversion and frame format encapsulation on the data received and sends the data subjected to the data bit conversion and the frame format encapsulation to a high-speed interface.

Here, the main structure for chip output is as follows:

First, bit conversion and frame format conversion are performed on a data block and related control information (SOP and EOP, mainly) sent from the MCT still by using the BC in line with the IPC so that data frames of an internal bit width are converted to bit widths of different interfaces, and the format of the data frame formats is re-encapsulated. The format is encapsulated according to a rule that a frame head is Start Of Package (SOP) and a frame end is End Of Package (EOP).

As the data received by an Ethernet cannot be interrupted while the packages read from the MCT are interrupted as blocks, the OPC sets a large FIFO for each externally connected high-speed interface to cache the package subjected to the bit and frame format conversion, and after a complete package is cached in the FIFO, the data of the package is read from the FIFO and sent to the interface.

In the present disclosure, data of a high-speed Ethernet are cached in a plurality of distributed cache pools, a distribution control is performed by a port scheduler, a currently idle cache pool address is preferably selected after the scheduling to write data into the cache pool of an SDRAM; a device can read a package from the cache pool of the SDRAM automatically or receive an external request concerning the special reading of the currently stored data and then read a package, sequentially process an Ethernet package output from the cache and output the processed Ethernet package to a high-speed interface, thereby realizing the caching-forwarding of Ethernet data in the device.

Although preferred embodiments of the present disclosure are disclosed for illustration only, it should be appreciated by those skilled in the art that a variety of improvements, additions and substitutes are devisable, therefore, the scope of the present disclosure is not limited to the foregoing embodiments.

The invention claimed is:

1. A data caching system for an Ethernet device, the data caching system comprising:
an input package process device IPC configured to receive data frames from various Ethernet interfaces, and convert the data frames received from the Ethernet interfaces into data frames having a uniform bit width and a uniform encapsulation format;
a package address management device PMG configured to maintain a cache address in which data has already been written and a currently idle cache address in a cache;
a memory control device MCT configured to receive the currently idle cache address from the PMG, generate a write instruction and/or a read instruction for the cache, and perform a write operation and/or a read operation to write the converted data frames received and processed by the IPC into a currently idle cache or to read data from the cache, wherein the read instruction and/or the write instruction are/is based on an internal read request and/or an internal write request of the system or are/is generated according to a read request received from the outside of the system; and
an output package process device OPC configured to perform bit conversion and format encapsulation on the data that is read by the MCT based on the read request, and output the data subjected to the bit conversion and the format encapsulation through a corresponding Ethernet interface.

2. The data caching system according to claim 1, wherein the IPC comprises a plurality of bit converters BCs and a port scheduler SCH, wherein
the BC is configured to receive data frames from one type of Ethernet interfaces and independently convert the received Ethernet data frames into data frames having a uniform bit width and a uniform encapsulation format; and
the port scheduler SCH is configured to perform a scheduling operation according to a data sending request of each BC, and send, by taking a data block of a size of fixed bytes as a unit, the data subjected to the bit conversion and the format encapsulation in the plurality of BCs to the cache in a scheduling sequence.

3. The data caching system according to claim 2, wherein the BC is connected with an FIFO; a read FIFO and a write FIFO are separately set to execute a read instruction or a write instruction so that a read channel is separated from a write channel; the read FIFO and the write FIFO are polled by a polling device; if there are a predetermined number of read instructions or write instructions in the polled FIFO, the polling device makes the polled FIFO execute the predetermined number of read instructions or write instructions at a time; if there is data needed to be processed in the polled FIFO while the number of the read instructions or write instructions accumulated within a preset period of time fails to reach a predetermined number, the polling device forces the polled FIFO to execute existing read instructions or write instructions at a time.

4. The data caching system according to claim 1, wherein the MCT comprises:
a Group Read/Write Order device GROUP configured to generate a write instruction according to a write request sent from the IPC and the currently idle cache address maintained by the PMG, and execute the generated write instruction; generate a read instruction according to a read request sent from the OPC and execute the generated read instruction; generate a read instruction according to a read request sent from an external application layer of the system and execute the generated read instruction; and output the data read from the cache to the OPC or the external application layer of the system according to an output channel selected by an output channel mode selection device;
the output channel mode selection device is configured to select the data output channel.

5. The data caching system according to claim 1, wherein the PMG is configured to maintain cache addresses according to a group data cache region and acquire an idle cache address through interleaving access, wherein after a first group of data cache regions are accessed, the other regions excluding the first group of data cache regions are accessed during a second access, and the first group of data cache regions are accessed again only when there is no idle cache address in the other regions excluding the first group of data cache regions; likewise, the other regions excluding the second group of data cache regions are accessed during a third access, and the second group of data cache regions are accessed again only when there is no idle cache address in the other regions excluding the second group of data cache regions; and if no idle cache address is found after each group of data cache regions are traversed, the current write operation is given up to discard data and not resumed unless there is an idle cache address available.

6. The data caching system according to claim 5, wherein the group data cache region corresponds to a group of Bank addresses of the cache, wherein a first Bank is precharged after the first Bank is accessed and before the first Bank is accessed again.

7. The data caching system according to claim 5, wherein when a plurality of read instructions are generated by the MCT, the plurality of read instructions are sorted so that read instructions corresponding to cache addresses read in an interleaving manner are placed at the front to execute a read operation, and data is re-sorted in a sequence desired by the inside or the outside of the system and then output.

8. A data caching method for an Ethernet device, comprising:
receiving data frames from various Ethernet interfaces and converting the data frames received from the Ethernet interfaces into data frames having a uniform bit width and a uniform encapsulation format;
maintaining a cache address in which data has already been written and a currently idle cache address in a cache;
receiving the currently idle cache address and generating a write instruction and/or a read instruction for the cache, and performing a write operation and/or a read operation so as to write the converted data frames received and processed by an input package process device IPC into a currently idle cache or to read data from the cache, wherein the read instruction and/or the write instruction are/is based on an internal read request and/or an internal write request of a data caching system for an Ethernet device or are/is generated according to a read request received from the outside of the system; and
performing bit conversion and format encapsulation on the data that is read according to the read request and outputting the data subjected to the bit conversion and the format encapsulation through a corresponding Ethernet interface.

9. The data caching method according to claim 8, wherein the data subjected to the bit conversion and the format encapsulation is scheduled to be sequentially sent to the cache in a scheduling sequence by taking a data block of a size of fixed bytes as a unit.

10. The data caching method according to claim 9, wherein the algorithm for the scheduling is based on a ROUND-ROBIN polling algorithm or a weighted ROUND-ROBIN polling algorithm.

11. The data caching method according to claim 8, wherein the generated read instructions or write instructions are accumulated, and when the generated read instructions or write instructions are accumulated to a predetermined number, the accumulated read instructions or write instructions are executed at a time; if the number of the read instructions or write instruction accumulated within a given period of time fails to reach the predetermined number, the accumulated read instructions or write instructions are executed at a time.

12. The data caching method according to claim 8, wherein the maintenance refers to the maintenance of cache addresses according to a group data cache region, and the idle cache address is acquired through interleaving access, wherein after a first group of data cache regions are accessed, the other regions excluding the first group of data cache regions are accessed during a second access, and the first group of data cache regions are accessed again only when there is no idle cache address in the other regions excluding the first group of data cache regions; likewise, the other regions excluding the second group of data cache regions are accessed during a third access, and the second group of data cache regions are accessed again only when there is no idle cache address in the other regions excluding the second group of data cache regions; and if no idle cache address is found after each group of data cache regions are traversed, the current write operation is given up to discard data and not resumed unless there is an idle cache address available.

13. The data caching method according to claim 12, wherein the group data cache region corresponds to a group of Bank addresses of the cache, wherein a first Bank is precharged after the first Bank is accessed and before the first Bank is accessed again.

14. The data caching method according to claim 12, wherein when a plurality of read instructions are generated, the plurality of read instructions are sorted so that read instructions corresponding to cache addresses read in an interleaving manner are placed at the front to execute a read operation, and data is re-sorted in a sequence desired by the inside or the outside of the system and then output.

* * * * *